(12) United States Patent
Calhoon

(10) Patent No.: US 7,893,553 B1
(45) Date of Patent: Feb. 22, 2011

(54) WIND ENERGY SYSTEM

(76) Inventor: Scott W. Calhoon, 1500 Glenwood Ave., Oklahoma City, OK (US) 73116-5207

( * ) Notice: Subject to any disclaimer, the term of this patent is extended or adjusted under 35 U.S.C. 154(b) by 0 days.

(21) Appl. No.: 12/371,802

(22) Filed: Feb. 16, 2009

Related U.S. Application Data

(60) Division of application No. 11/955,111, filed on Dec. 12, 2007, now abandoned, which is a continuation of application No. 11/277,929, filed on Mar. 29, 2006, now Pat. No. 7,368,828.

(51) Int. Cl.
*F03D 9/00* (2006.01)
*H02P 9/04* (2006.01)

(52) U.S. Cl. .......................... 290/44; 290/55
(58) Field of Classification Search ............... 290/43, 290/44, 54, 55; 416/132 B, 7; 60/398; 415/4.2, 415/4.1, 4.5, 2.1
See application file for complete search history.

(56) References Cited

U.S. PATENT DOCUMENTS

| | | | | |
|---|---|---|---|---|
| 757,800 | A * | 4/1904 | Williams | 290/55 |
| 1,112,203 | A * | 9/1914 | Fandrey | 415/4.4 |
| 1,345,022 | A * | 6/1920 | Oliver | 415/4.3 |
| 1,783,669 | A * | 12/1930 | Oliver | 415/4.5 |
| 3,436,908 | A * | 4/1969 | Van Delic | 126/634 |
| 3,621,930 | A * | 11/1971 | Dutchak | 180/65.31 |
| 3,750,001 | A * | 7/1973 | McCloskey | 322/35 |
| 3,883,750 | A * | 5/1975 | Uzzell, Jr. | 290/55 |
| 4,012,163 | A * | 3/1977 | Baumgartner et al. | 415/208.3 |
| 4,079,264 | A * | 3/1978 | Cohen | 290/55 |
| 4,218,175 | A * | 8/1980 | Carpenter | 415/219.1 |
| 4,421,452 | A * | 12/1983 | Rougemont | 415/4.2 |
| 6,246,126 | B1 * | 6/2001 | Van Der Veken et al. | 290/55 |
| 6,409,467 | B1 * | 6/2002 | Gutterman | 415/4.3 |
| 7,183,664 | B2 * | 2/2007 | McClintic | 290/55 |
| 7,368,828 | B1 * | 5/2008 | Calhoon | 290/55 |
| 2003/0035725 | A1 * | 2/2003 | Sosonkina | 416/11 |

(Continued)

FOREIGN PATENT DOCUMENTS

DE   1980-016434   * 10/1980

(Continued)

OTHER PUBLICATIONS

English translation of French Patent Application No. 81-197726 published Apr. 22, 1983 under Publication No. 2,514,833, entitled "Wind Pump Nozzle."

*Primary Examiner*—Julio Gonzalez
(74) *Attorney, Agent, or Firm*—Mary M. Lee

(57) ABSTRACT

A wind energy system comprising a queue of turbines housed in a horizontal air conduit. The inlet end of the conduit opens into a wind collector assembly, which preferably comprises in part downwardly extending earthen slope, such as a hillside or embankment. The wind collector assembly may include a pair of lateral collectors, such as sails, that flank the inlet end of the conduit. An upper collector, similar to a spinnaker, may be included above the shaft and between the flanking sails. The flanking sails preferably are retractable and may be hydraulically controlled. Thus, the wind collector assembly formed by the spinnaker above, the earthen slope below and the lateral sails flanking the inlet, serves to collect wind and channel it into the conduit. Generators coupled to the turbines are electrically connected to a power plant or to an alternate electrical facility on or off the grid.

16 Claims, 3 Drawing Sheets

U.S. PATENT DOCUMENTS

2003/0178855 A1* 9/2003 Li .............................. 290/43

FOREIGN PATENT DOCUMENTS

| | | |
|---|---|---|
| DE | 20203706 | 7/2002 |
| FR | 7439583 | 6/1976 |
| FR | 2514833 | 4/1983 |
| WO | WO0112986 A2 | 2/2001 |
| WO | WO2006066502 A1 | 6/2006 |

* cited by examiner

WIND ENERGY SYSTEM

CROSS-REFERENCE TO RELATED APPLICATIONS

This application is a divisional application of pending application Ser. No. 11/955,111 titled "Wind Energy System" filed Dec. 12, 2007, which is a continuation of application Ser. No. 11/277,929 titled "Wind Energy System" filed Mar. 29, 2006, now U.S. Pat. No. 7,368,828. The contents of these prior applications are incorporated herein by reference.

FIELD OF THE INVENTION

The present invention relates generally to wind energy systems, and, more particularly but without limitation, to systems that convert wind to electricity.

BACKGROUND OF THE INVENTION

As energy from fossil fuels becomes more costly and the supplies dwindle, efficient and broad-based use of wind energy becomes an important alternative or supplemental source. Large "wind farms" effectively capture and convert wind into electricity. However, there remains a need for smaller, less expensive wind energy systems. There is also a need for systems that are less visually obtrusive and less likely to injure birds. The present invention meets these needs by providing a wind energy system in which a queue of wind turbines is concealed in a conduit that can be at least partially buried in the earth. Such a system also permits utilization of electricity generated in remote areas; off-grid systems can be used to generate hydrogen.

DETAILED DESCRIPTION OF THE PREFERRED EMBODIMENTS

Figure 1:
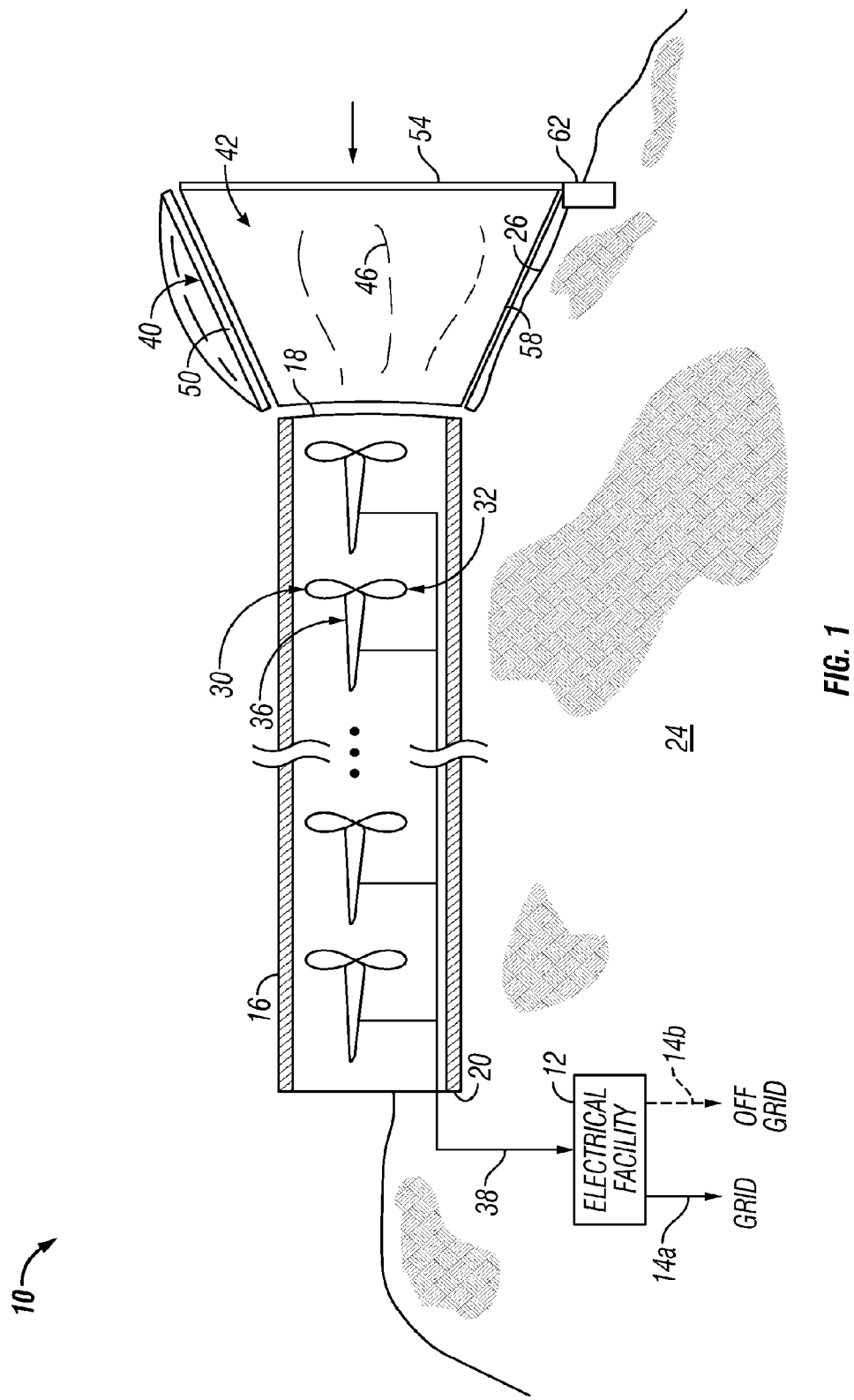
FIG. 1 is a schematic of a preferred embodiment of the wind energy system of the present invention. A partially buried culvert houses a plurality of wind turbines arranged front to back in the culvert. The inlet end of the culvert opens near the top of a mound of earth, such as a hill or ridge, and is flanked by sails for collecting wind and funneling it into the culvert, where it will run the turbines.
Figure 2:
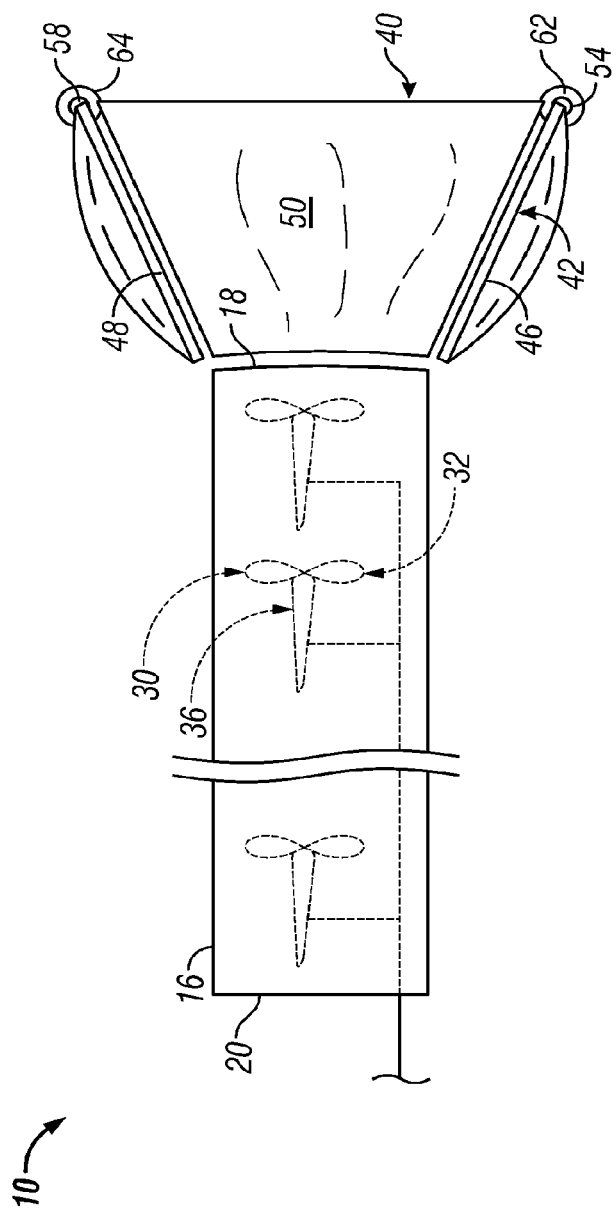
FIG. 2 is plan view of the system of FIG. 1.
Figure 3:
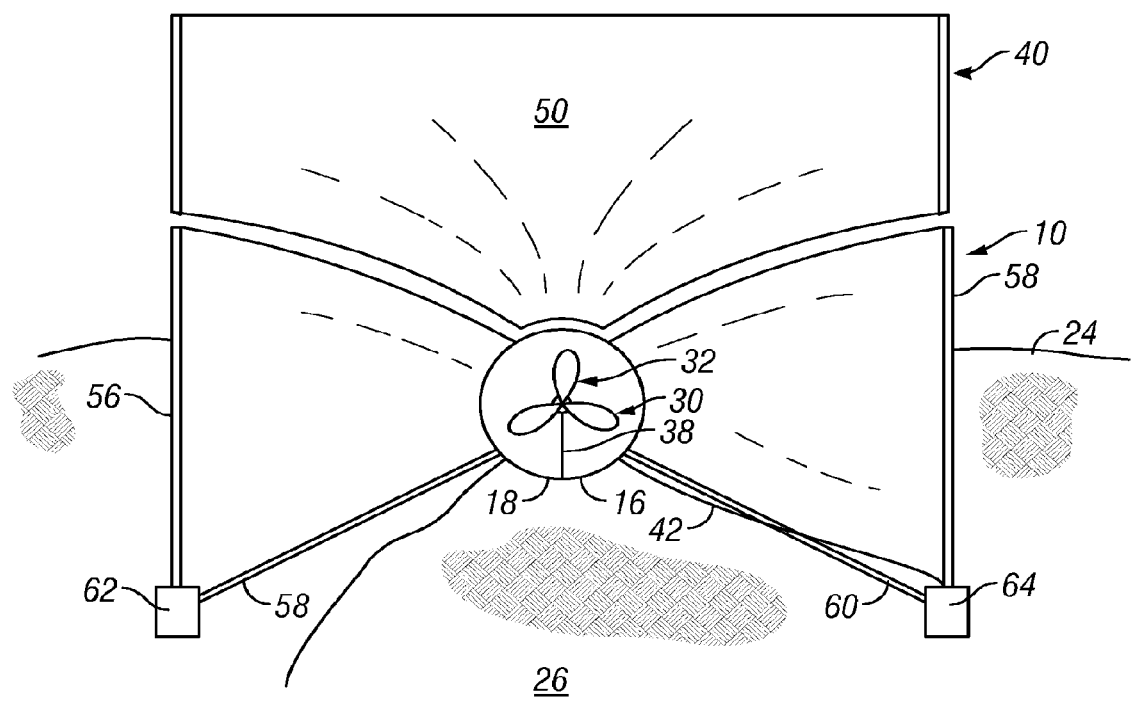
FIG. 3 is an end view of the inlet end of the system of FIG. 1.

Referring now to FIGS. 1-3, there is shown therein and designated generally by the reference number 10 a wind energy system constructed in accordance with the present invention. The wind energy system 10 of this invention is designed to provide electricity to an electrical facility 12, such as a power plant. The electrical facility 12 may serve to store, transfer or transform the electrical power. Depending on the nature of the electrical facility 12, it may be connected to the power grid at 14a or connected to another off-grid facility at 14b, such as an electrolysis plant for producing hydrogen. Alternately, the electrical facility 12 may be any system that consumes power, such as a dwelling or other building or structure that utilizes electricity.

The system 10 comprises an air conduit 16 having an inlet 18 and an outlet 20. The conduit 16 may by any suitable size, shape or configuration selected to cooperate with the other components of the system 10 described hereafter. The conduit 16 is adapted to receive wind in the inlet 18, to conduct the wind through the conduit, and to release the release wind through the outlet 20. In this embodiment, the conduit 16 is a solid tube conveniently formed of pre-cast concrete of the type used to make drainage culverts and the like. However, polyvinylchloride ("PVC") piping and many other materials may be utilized instead. In this embodiment, the length of the conduit 16 is about 100 feet and the diameter is about 24 feet.

In the preferred practice of the invention, the conduit 16 is at least partially buried in the earth. This provides the system 10 with a low and inconspicuous profile on the landscape or may even totally conceal it. In the embodiment illustrated in the drawings, the conduit 16 is partially buried in the earth 24, as best seen in FIGS. 1 and 3.

For reasons which will become apparent, the conduit 16 preferably is positioned so that the inlet 18 opens at the top of an earthen slope 26 so that the slope extends outwardly and downwardly from the inlet. The slope 26 may be formed by a man-made berm or embankment or a natural hillside. Preferably, the slope 26 has a grade of about 30 to about 45 degrees relative to the longitudinal axis of the air conduit 16.

As best seen in FIGS. 1 and 2, the system 10 further comprises a plurality of wind turbines designated collectively at 30. As used herein, "wind turbine" means any device or machine capable of converting wind into mechanical power. Examples of wind turbines include those devices characterized by a plurality of foils, such as vanes, blades, or sails, fixed to a rotor so that pressure from wind impacting the foils will cause the rotor to rotate.

The blades designated generally at 32 have a front wind gathering or face side and an opposing rear or back side. The wind turbines 30 are queued up along the length of the conduit 16. As used herein, "queued up" denotes an arrangement where the turbines are positioned front-to-back in a line, with the front or face side of the turbines facing the inlet 18 of the conduit 16. Now it will be understood that the conduit 16 forms a casement for the wind turbines 30 and that the shape, length and diameter of the conduit 16 may be selected to maximize the air dynamics of the system 10.

Also included in the system 10 is an electrical generator 36 coupled to each of the plurality of turbines 30. "Electrical generator" is used herein very broadly and denotes any device or machine that converts mechanical energy (rotation of the rotor) into electrical energy, whether it relies on a permanent magnet or an electromagnet or other technology. There may be a generator 36 for each turbine 30, as shown herein. Alternately, one generator may serve two or more of the turbines.

The electrical generators 36 thus convert rotational energy from the turbines 30 into electricity. The generators 36 are electrically connectable to the electrical facility 12 through wires 38 in a known manner.

In a preferred embodiment, the turbines are small wind turbines. Suitable turbines are available from Bergey Wind-Power Co. (Norman, Okla.), such as the Bergey Excell, which is a 10 Kw unit with a rotor span of 7 meters (about 23 feet). Preferably, the turbines have a blade span that permits the diameter of the conduit or casement to be minimized, and are designed to optimize effectiveness in concentrated wind environments. In addition, these turbines come equipped with built-in generators/alternators, simplifying assembly and installation in the system 10.

Now it will be apparent that wind entering the inlet 18 of the conduit 16 will rotate the blades 32 of the turbines 30 and be converted by the generators 36 into electricity that is passed to the electrical facility 12. To collect and concentrate wind and to funnel it into the inlet 18, the system 10 preferably includes a wind collector 40 extending outwardly at least partially around the inlet.

The collector 40 may take various forms. It may be a unitary structure or composed of several parts. It may be rigid or pliable. In the preferred embodiment illustrated herein, the collector 40 is formed in part by the earthen slope 26 extending downwardly from the inlet 18, as previously described. In this embodiment, the wind collector 40 also may include one or more sails designated generally at 42. The sails 42 may be formed of various materials. A preferred material is sailcloth or some other durable, pliable fabric.

As illustrated in FIGS. 1-3, the sails 40 advantageously include a pair of lateral collectors such as the lateral sails 46 and 48 and an upper, central collector, such as the spinnaker or topsail 50, shown only schematically in the drawings. The lateral sails 46 and 48 flank the inlet 18 of the conduit 16 extending upwardly from the earth 24. The spinnaker 50 is mounted between the lateral sails 46 and 48 above the inlet 18, generally extending from the top of the lateral sail 46 to the top of the other lateral sail 48.

Prevailing "generating" winds in many regions, especially in the Great Plains areas, are predominately southern or southwesterly. Thus, it is advantageous in systems installed in such areas to mount the sails 46 and 48 or the spinnaker 50 or both so that they can be raised and lowered independently to maximize and concentrate volumes of wind while maintaining stability of the sail support structures. This is especially useful during storms and other weather events likely to produce high straight line winds, which might otherwise exceed the stress tolerances of the sail plant.

For these reasons, it is usually desirable for the lateral sails 46 and 48 and the spinnaker 50 to be retractable for wind management and control. The retraction mechanisms may be manually operated or hydraulically driven. Even more preferably, the lateral sails 46 and 48 are independently deployable for maximum capture of transverse winds. To that end, the lateral sails 46 and 48 may be mounted on hydraulically controlled masts 54 and 56 and arms 58 and 60, which are supported in fixed piers 62 and 64 planted firmly in the earth 24, and extendable from a collapsed position near the ground to a partly or fully deployed position as illustrated in the drawings. The spinnaker may be mounted for downward deployment, partly or fully, as indicated by the wind direction and speed. The devices for mounting and deploying sails and spinnakers are well known and, therefore, no detailed description is provided herein.

Now it will be appreciated that the wind energy of the present invention provides several advantages. The turbines are concealed in the conduit, which itself may be hidden or at least partially buried in the earth. In this way, the visual effect on landscape is minimized. The wind collector at the inlet end of the conduit increases the wind volume that enters the conduit and increases the effectiveness of the turbines, queued up inside the conduit. A small, visually obscure wind energy system as described herein makes the use of wind energy more wide available and thus reduces the reliance on more expensive and exhaustible fossil fuels.

Changes can be made in the combination and arrangement of the various parts and steps described herein without departing from the spirit and scope of the invention as defined by the following claims.

What is claimed is:

1. A wind energy system for providing electricity to an electrical facility for storage, consumption or further processing, the system comprising:
    a horizontal air conduit having an inlet and an outlet;
    a plurality of wind turbines queued up along the length of the air conduit, each turbine comprising its own independently rotatable rotor;
    an electrical generator coupled to the rotor of each of the plurality of turbines to convert rotational energy from the turbine into electricity, each generator being electrically connectable to the electrical facility; and
    an open air, unpressurized wind collector assembly extending outwardly at least partially around the inlet of the air conduit and being at least partially adjustable in response to changes in wind direction and speed, such adjustability being independent of the position of the conduit and without obstructing the inlet of the conduit.

2. The wind energy system of claim 1 wherein each of the turbines is a small wind turbine.

3. The wind energy system of claim 1 wherein the wind collector assembly comprises a pair of lateral collectors that flank the inlet end of the air conduit and an upper central collector over the inlet end of the air conduit.

4. The wind energy system of claim 1 wherein the length of the air conduit in which the wind turbines are queued up is at least partially buried in the earth.

5. The wind energy system of claim 4 wherein the wind collector assembly comprises an earthen slope extending downwardly from the inlet of the air conduit.

6. The wind energy system of claim 1 wherein the wind collector comprises at least one fabric sail.

7. The wind energy system of claim 6 wherein the at least one fabric sail comprises a pair of lateral sails that flank the inlet of the air conduit.

8. The wind energy system of claim 7 wherein the at least one fabric sail comprises a spinnaker mounted above the inlet of the air conduit.

9. The wind energy system of claim 8 wherein the lateral sails are retractable.

10. The wind energy system of claim 9 wherein the spinnaker is retractable.

11. The wind energy system of claim 10 wherein the lateral sails are hydraulically retractable.

12. The wind energy system of claim 11 wherein the lateral sails are independently deployable.

13. The wind energy system of claim 1 wherein the conduit is mounted non-rotatably.

14. The wind energy system of claim 1 wherein the conduit has a constant inner diameter from the inlet to the outlet.

15. The wind energy system of claim 1 wherein the wind collector assembly comprises at least one collector that is vertically retractable.

16. The wind energy system of claim 15 wherein the wind collector assembly comprises a pair of lateral collectors that flank the inlet end of the air conduit and an upper central collector over the inlet end of the air conduit, the lateral and upper collectors being vertically retractable.

* * * * *